UNITED STATES PATENT OFFICE.

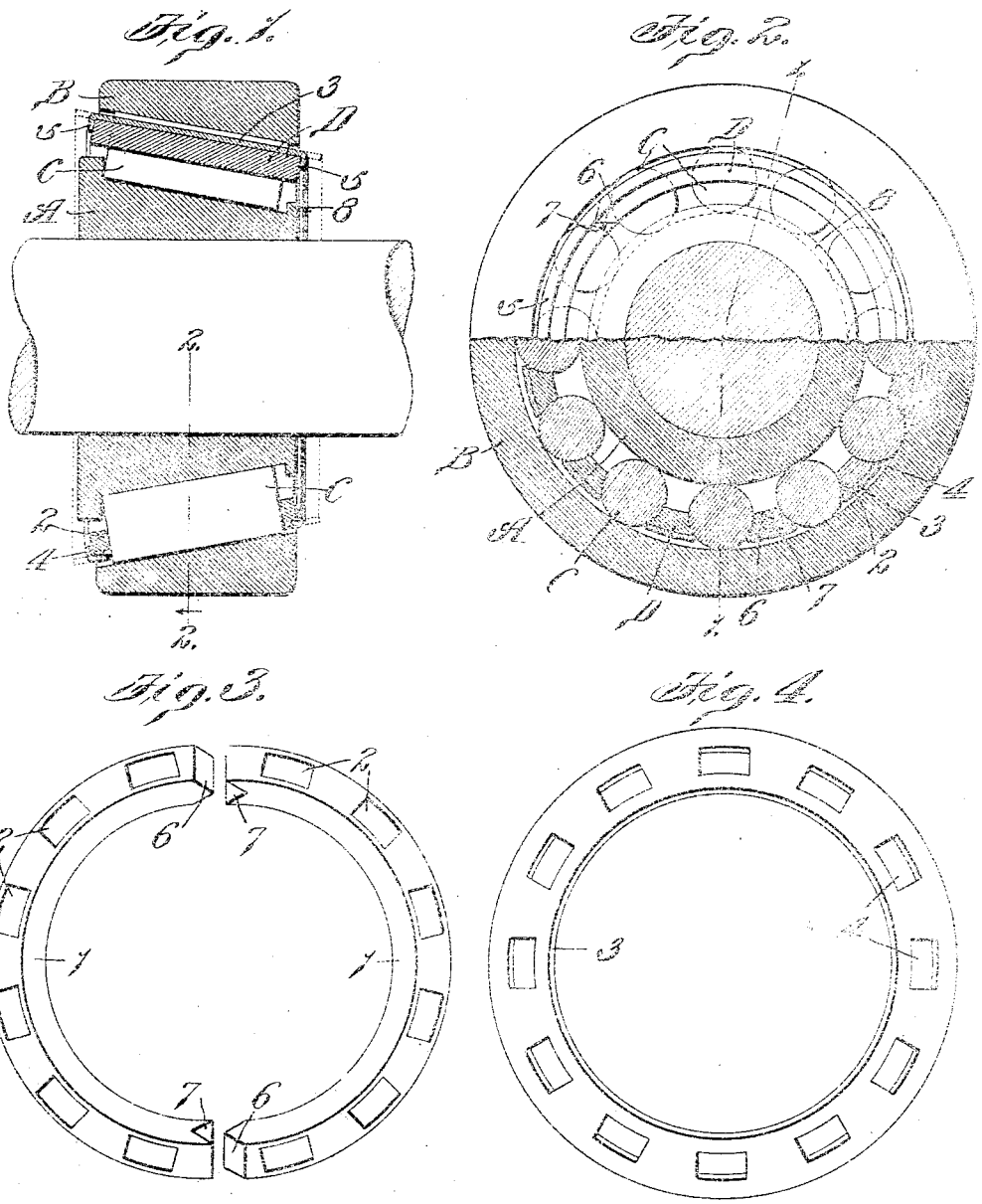
C. A. HEINZELMAN.
ROLLER BEARING CAGE.
APPLICATION FILED FEB. 24, 1913.
1,125,316. Patented Jan. 19, 1915.

CHESTER ARTHUR HEINZELMAN, OF BELLEVILLE, ILLINOIS.

ROLLER-BEARING CAGE.

1,125,316.

Specification of Letters Patent.

Patented Jan. 19, 1915.

Application filed February 24, 1913. Serial No. 750,349.

*To all whom it may concern:*

Be it known that I, CHESTER A. HEINZELMAN, a citizen of the United States, residing at Belleville, Illinois, have invented a certain new and useful Improvement in Roller-Bearing Cages, of which the following is a full, clear, and exact description, such as will enable others skilled in the art to which it appertains to make and use the same.

This invention relates to roller bearing cages, and more particularly to roller bearing cages that are formed of cast metal. Great difficulty has been heretofore experienced in the manufacture of cast metal roller bearing cages on account of the shrinkage of the metal, this being more especially noticeable in large-sized cages. Because of the fact that these cages are cast in one piece and in metal dies, a peculiar condition arises wherein the metal forming the cage cannot shrink while in contact with the walls of the metal die, though the tendency is, of course, there, but immediately upon removal from the dies the shrinkage takes place instantaneously so that should there be any flaw or weak place in the cage a breakage is very likely to occur. Another objectionable feature of the cast metal cages heretofore used is the tendency of the cage to warp and assume a noncircular shape when removed from the dies unless the metal comprising same is perfectly distributed and flawless. And still another objectionable feature of such cages is that the rollers have to be arranged in the cage before said cage is placed on the inner bearing member or cone, and in order to retain the cage and rollers in place it is necessary to provide a separate retaining ring that is arranged on the small end of the cone after the cage has been placed in position.

The main object of my invention is to provide a cage that can be manufactured as heretofore in metal dies but which will not break or warp.

Another object is to provide a cage which is so designed that it can be used with a bearing whose inner bearing member or cone is provided with integral flanges that prevent longitudinal movement of the cage in either direction.

Briefly described, my invention consists in forming a roller bearing cage from a plurality of cast metal arc-shaped sections and thereafter uniting said sections to form the complete cage.

Figure 1 of the drawings is a vertical sectional view of a roller bearing provided with a cage constructed in accordance with my invention: Fig. 2 is an end view of the roller bearing partly in vertical section on the line 2—2 of Fig. 1; Fig. 3 is an end elevational view of the sections comprising the cage; and Fig. 4 is an end elevational view of the sleeve that embraces the cage sections.

Referring to the drawings which illustrate the preferred form of my invention, A and B, respectively, designate the inner and outer members of a roller bearing which form a raceway for the rollers C arranged between same, as shown in Figs. 1 and 2, the inner member of the bearing herein shown being substantially cone-shaped and the outer member consisting of a cup or ring whose inner surface is tapered slightly. The rollers C are held in a certain position with relation to each other by means of a cage of novel construction which comprises a cast metal cylindrical-shaped body portion D, formed in sections, and a sheet metal sleeve 3, preferably a steel stamping, that surrounds said body portion and which is permanently combined with same. The cast metal body portion D and the sleeve 3 of the cage are tapered when the cage is designed for use with a bearing of the type herein shown, and alining openings 2 and 4 are formed in the members D and 3, respectively, for receiving the rollers C of the bearing. The body portion D of the cage herein shown is composed of two sections 1, but I wish it to be understood that my invention is not limited to this exact construction as the body portion D could be formed of any convenient number of sections, or of one piece in the form of a split ring, without departing from the spirit of my invention. In practice, I prefer to make the sleeve 3 slightly longer than the body portion D of the cage which it encircles, as shown in Fig. 1, so that when assembling the parts of the cage the ends of said sleeve project beyond the ends of the body portion D. The ends of said sleeve are thereafter turned down by spinning or otherwise to form retaining flanges 5 at each end of the sections 1 of the body portion D of the cage.

The meeting edges of the segments 1 are preferably interlocked by any suitable means so as to facilitate the assemblage of same, the means herein shown comprising a tongue 6 on the edge of one of said members that projects into a correspondingly-shaped groove 7 formed in the edge of the adjacent member.

In assembling the complete bearing the several sections 1 of the body portion D of the cage and the rollers C of the bearing are arranged about the inner bearing member or cone A, and the sleeve 3 is then forced over said sections 1 and turned down at the ends to form the retaining flanges 5. Thereafter, the outer bearing member B is placed in position. A retaining ring or flange 8 formed integral with the cone A acts to keep the rollers and cage in operative position on said cone.

A roller bearing cage of the construction above described is strong and light, and on account of its novel construction the cast metal portion of same is not liable to break or warp.

Having thus described my invention, what I claim as new and desire to secure by Letters Patent is:

1. A cage for roller bearings consisting of a cast metal body portion of cylindrical or tubular shape, divided longitudinally into a plurality of sections, and a smooth sheet metal sleeve surrounding said body portion and acting to hold the sections of same together, said body portion having roller-receiving openings and said sleeve also having openings or cut-out portions for the rollers.

2. A cage for roller bearings, consisting of a cast metal body portion of cylindrical or tubular shape, divided longitudinally into a plurality of sections, a smooth sheet metal sleeve surrounding said body portion and acting to hold the sections of same together, said body portion having roller-receiving openings and said sleeve also having openings or cut-out portions for the rollers, and coöperating interlocking means on the longitudinal edges of the sections of said body portion.

3. A cage for roller bearings, consisting of a cast metal body portion of cylindrical or tubular shape, divided longitudinally into a plurality of sections, a smooth sheet metal sleeve surrounding said body portion and acting to hold the sections of same together, said body portion having roller-receiving openings and said sleeve also having openings or cut-out portions for the rollers, and being permanently combined with said body portion.

4. A cage for roller bearings, consisting of a cast metal body portion of cylindrical or tubular shape, divided longitudinally into a plurality of sections, and a sheet metal sleeve surrounding said body portion and acting to hold the sections of same together, said body portion having roller-receiving openings and said sleeve being provided at its ends with retaining flanges that lap over the ends of the sections of said body portion.

5. A cage for roller bearings, consisting of a cast metal body portion of cylindrical or tubular shape, divided longitudinally into a plurality of sections that are provided with coöperating interlocking means, and a sheet metal sleeve surrounding said body portion and having its ends bent over the ends of said body portion so as to permanently combine said parts together, said body portion and sleeve having alining longitudinally extending openings for receiving the rollers of the bearing.

In testimony whereof I hereunto affix my signature in the presence of two witnesses.

CHESTER ARTHUR HEINZELMAN.

Witnesses:
WM. M. HOPPE,
WANDA M. HEINRICH.